United States Patent
Werner et al.

(10) Patent No.: US 12,206,722 B2
(45) Date of Patent: Jan. 21, 2025

(54) CORRECTING DISRUPTION OF A NETWORK DURING A VIRTUAL MEETING

(71) Applicant: Taiwan Semiconductor Manufacturing Company, Ltd., Hsinchu (TW)

(72) Inventors: John S. Werner, Fishkill, NY (US); Arkadiy O. Tsfasman, Wappingers Falls, NY (US); Sagarika Mukesh, Albany, NY (US); Dong Hyun Kim, Stoneham, MA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 18/167,536

(22) Filed: Feb. 10, 2023

(65) Prior Publication Data
US 2024/0275838 A1   Aug. 15, 2024

(51) Int. Cl.
*H04L 65/80* (2022.01)
*H04L 43/0811* (2022.01)
*H04L 65/1089* (2022.01)
*H04L 65/613* (2022.01)

(52) U.S. Cl.
CPC .......... *H04L 65/80* (2013.01); *H04L 43/0811* (2013.01); *H04L 65/1089* (2013.01); *H04L 65/613* (2022.05)

(58) Field of Classification Search
CPC ... H04L 65/80; H04L 65/613; H04L 65/1089; H04L 43/0811
See application file for complete search history.

(56) References Cited

U.S. PATENT DOCUMENTS

| | | | |
|---|---|---|---|
| 7,362,349 B2 | 4/2008 | Nelson et al. | |
| 7,386,316 B2 | 6/2008 | Shieh | |
| 8,395,994 B2 | 3/2013 | Stevenson | |
| 8,537,659 B2 | 9/2013 | Fitchett et al. | |
| 8,547,880 B2 | 10/2013 | Yoakum et al. | |
| 8,934,381 B2 | 1/2015 | Rodman et al. | |
| 9,185,346 B2 | 11/2015 | Gröndal et al. | |
| 9,258,524 B2 | 2/2016 | DeLuca et al. | |
| 9,363,480 B2 | 6/2016 | Ramalho | |
| 9,420,510 B1 | 8/2016 | Surmay et al. | |
| 10,516,850 B2 | 12/2019 | Salfati et al. | |
| 2015/0350452 A1 | 12/2015 | Meghani | |
| 2016/0105473 A1* | 4/2016 | Klingbeil | H04L 47/283 370/260 |
| 2016/0266871 A1* | 9/2016 | Schmid | G10L 15/22 |
| 2018/0006837 A1* | 1/2018 | Cartwright | H04N 7/147 |
| 2018/0063563 A1 | 3/2018 | Calvert | |
| 2022/0191266 A1* | 6/2022 | Rahman | H04L 65/10 |

FOREIGN PATENT DOCUMENTS

WO   2009076178 A1   6/2009

* cited by examiner

*Primary Examiner* — Nicholas P Celani
(74) *Attorney, Agent, or Firm* — Harrity & Harrity, LLP

(57) ABSTRACT

Some implementations described herein provide apparatuses and techniques for correcting a network disruption during a virtual meeting. In response to detecting audio and/or video input to a first device, audio and/or video data is recorded and stored in a temporary buffer of the first device. After the network disruption, and using time stamps, a network disruption server may request the audio and/or video data from the first device and transmit the audio and/or video data to a second device at an accelerated rate.

20 Claims, 12 Drawing Sheets

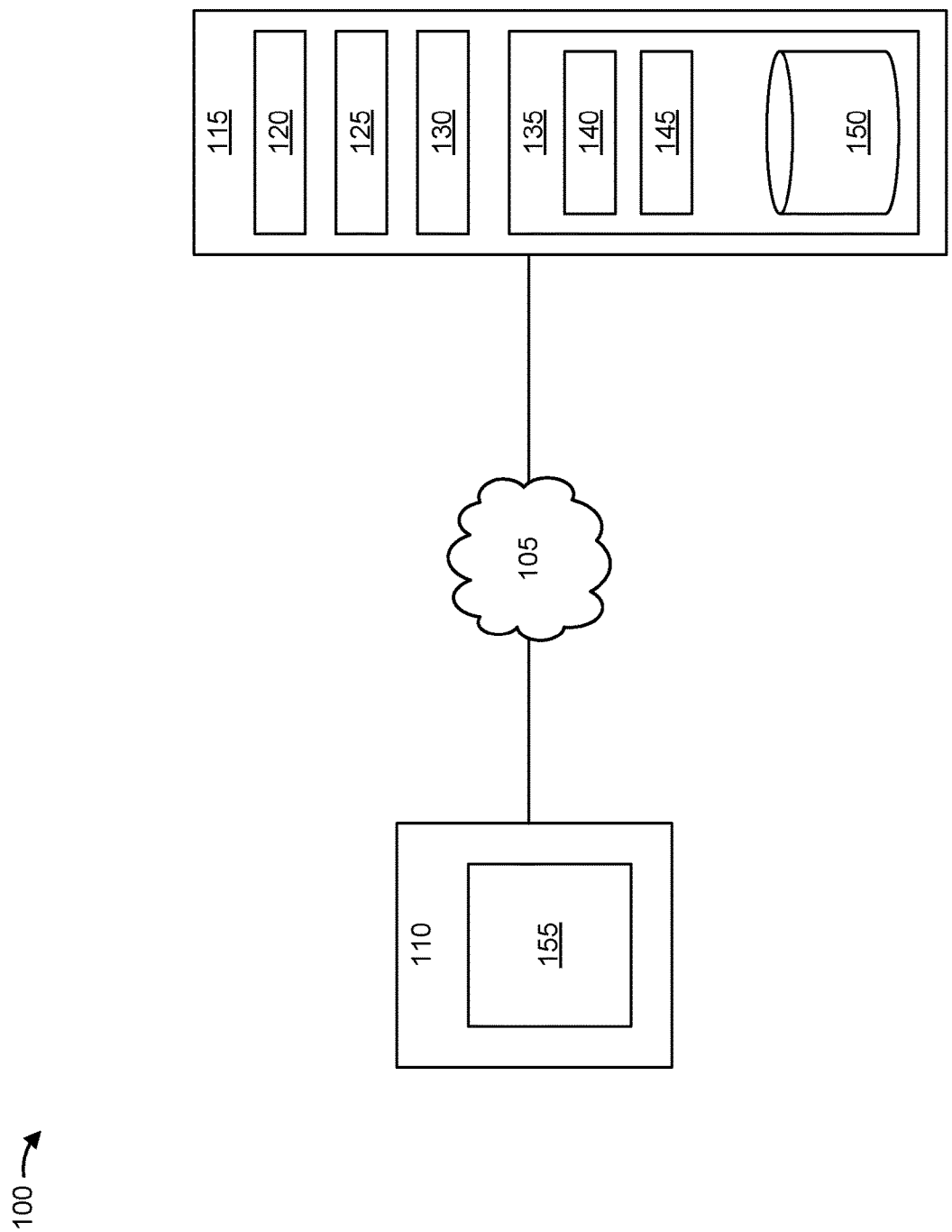

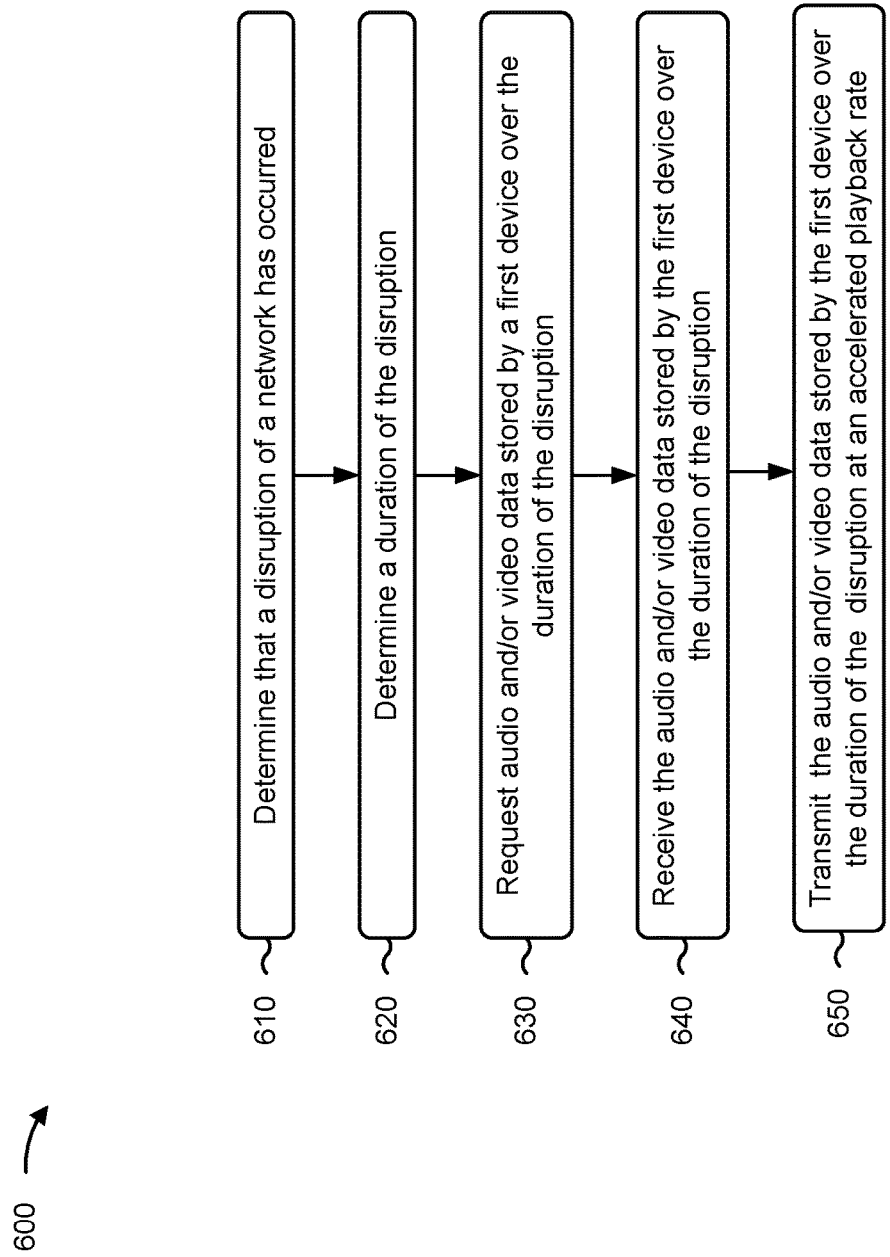

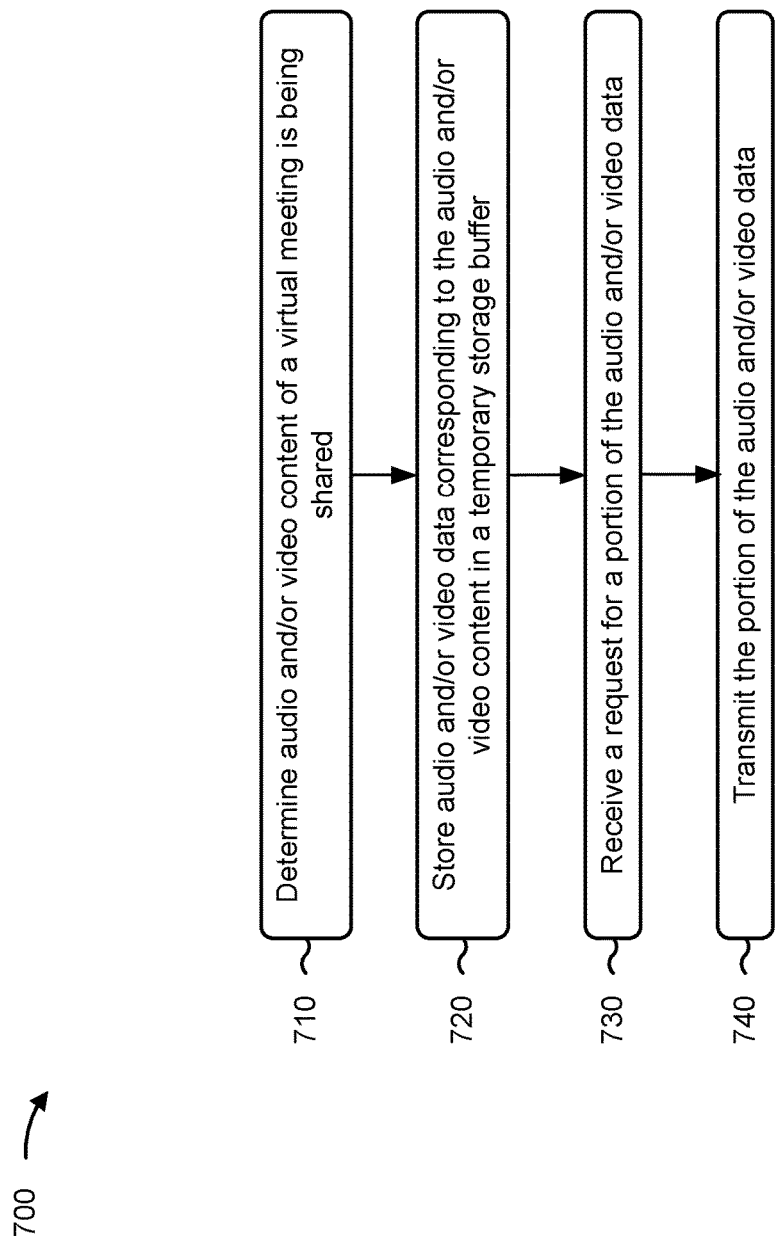

CORRECTING DISRUPTION OF A NETWORK DURING A VIRTUAL MEETING

BACKGROUND

As virtual meetings have become the prevalent method of communication, a quality (and/or reliability) of the audio and/or video communications have become increasingly important. The quality of the audio and/or video communications may depend heavily upon a quality of a network connection between device of users in the virtual meeting and a network supporting the virtual meeting. The quality of the network connection may easily fluctuate depending on multiple environmental factors that are difficult to control, such as a location of the device and/or a host computing system supporting the network, as well as a performance of the network (a bandwidth, a data packet loss rate, or a transmission signal strength, among other examples).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 is a diagram of example devices for correcting disruption of a network during a virtual meeting.

FIGS. 6 and 7 are flowcharts of example processes associated with correcting disruption of a network during a virtual meeting.

DETAILED DESCRIPTION

Figure 2A:
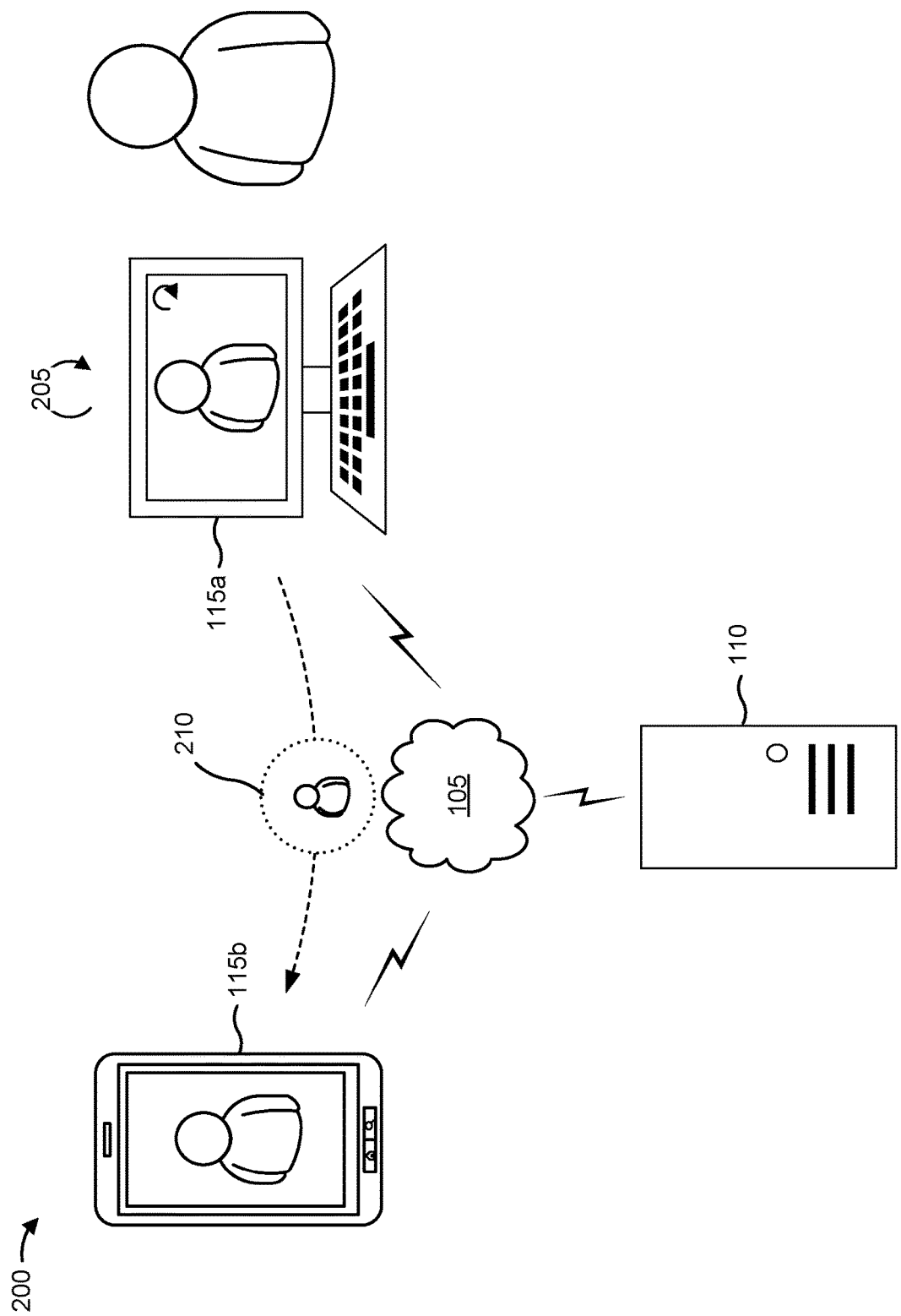
FIGS. 2A-2E are diagrams of an example implementation described herein.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In some cases, a virtual meeting may include users. With many users, disruptions related to a quality of a network connection may occur frequently, rendering the experience for one or more users unpleasant or unproductive. Further, and in such cases, users do not know if one or more other users are experiencing issues or missing audio and/or video content due to a poor network connection.

Techniques that are currently available to address a poor network connection may be ineffective. As an example, a web-conferencing system may detect a data packet loss (e.g., indicative of a poor network connection) and retransmit (e.g., retransmit) data packets at an accelerated rate from a first device (e.g., a presenter's device) to a second device (e.g., a recipient device) for a limited duration (e.g., one second or less). However, and due to the accelerated rate of transmission, content of the data packets (e.g., audio and/or video content) may be difficult for a user of the second device to hear and/or see clearly. Furthermore, longer network disruptions (e.g., greater than one second) may not be addressed.

Some implementations described herein provide apparatuses and techniques for correcting a network disruption during a virtual meeting. Based on detecting audio and/or video input to a first device, the first device records audio and/or video data and stores the audio and/or video data in a temporary buffer of the first device. After the network disruption, and using time stamps, a network disruption server may request the audio and/or video data from the first device and transmit the audio and/or video data to a second device at an accelerated rate.

Relative to other apparatuses and techniques, the described implementations (e.g., using the time stamps) may increase an amount of audio and/or video data that that may be recovered from a network disruption and that may be transmitted to the second device over a given time period. In this way, an overall computing efficiency of the second device (e.g., use of computing resources for the given period of time) may be increased.

FIG. 1 is a diagram 100 of example devices for correcting a disruption of a network during virtual meeting. The diagram 100 includes a network 105, a network disruption server 110, and a user device 115. The network disruption server 110 and the user device 115 may be interconnected via the network 105.

The network 105 may include one or more wired and/or wireless networks. For example, the network 105 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 105 enables communication among the devices of FIG. 1.

The network disruption server 110 may manage communication of audio and/or video data impeded by a network disruption during the virtual meeting. The network disruption may be a temporary disruption (e.g., for several seconds of the virtual meeting) or a complete disruption (e.g., from a point of disruption to an end of the virtual meeting).

Through the user device 115, a user may join or initiate the virtual meeting. The user device 115 may include one or more devices capable of receiving, generating, storing, processing, and/or providing information associated with correcting a temporary disruption of a network during a virtual meeting as described elsewhere herein. The user device 115 may include a communication device and/or a computing device. For example, the user device 115 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

As shown, the user device 115 may include or be associated with a microphone 120 (e.g., an audio input component), a speaker 125 (e.g., an audio output component), a camera 130 (e.g., a video input component), and a network disruption correction application 135. The microphone 120 and the speaker 125 may be part of the user device 115 or may be peripheral devices that connect to the user device 115. The microphone 120 may record audio data from the user during the virtual meeting, and the speaker 125 may allow the user to hear audio data from another device that is part of the audio/video virtual meeting. The camera 130 may capture video data, such as video data of the user, during a virtual meeting. The camera 130 may be optional and only utilized if the user of user device 115 wishes to share visual data.

The network disruption correction application 135 on the user device 115 may be included as part of a program supporting participation in virtual meetings. Examples of programs supporting participation in virtual meetings include WebEx®, Jabber®, Slack®, Zoom®, Facetime®, Microsoft Teams®, Google Hangouts®, or Skype®, among other examples. Such programs, including the network disruption correction application 135, may be stored in a computer readable medium (CRM) of the user device 115.

The network disruption correction application 135 includes a temporary recording module 140, a quality monitor module 145, and a temporary audio/video buffer 150. In some implementations, the temporary recording module 140 records input data (e.g., audio data and/or video data) received locally at the user device 115 (i.e., audio data and/or video data captured by the microphone 120 and/or the camera 130). In some implementations, the temporary recording module 140 records input data being presented on the user device 115 (e.g., audio data and/or video data associated with a presentation being played on the user device 115). In some implementations, the temporary recording module does not store input data (e.g., audio data and/or video data) received from another device that is part of the virtual meeting. In some implementations, temporary recording module 140 segregates audio data from video data. In some implementations, audio and/or video data related to each user is stored locally on each user's user device. The playback module 155, of the network disruption server 110, may receive stored input data from one or more user devices 115 based on detection of a network disruption.

The quality monitor module 145 may monitor the quality of the network connection on the user device 115 to detect a network disruption. As an example, the quality monitor module 145 may determine a network disruption has occurred when a connection fails to satisfy a speed threshold (e.g., <approximately 8 Mbps for a virtual meeting).

Other example thresholds include a bandwidth threshold, a data packet loss rate threshold, a transmitting signal strength threshold, or a receiving signal strength threshold. In some implementations, such thresholds may be configurable settings within the quality monitor module 145. Additionally, or alternatively, a threshold for a length of the temporary disruption of a network may be a configurable setting within the quality monitor module 145.

In some implementations, one or more values related to the settings (e.g., the thresholds) are input through a user interface of the user device 115. In some implementations, one or more values related to the settings are received from another device (e.g., the network disruption server 110, an administrative device, and/or the like).

In some implementations, the user device 115 transmits a notification to playback module 155. The notification may include one or more time stamps (e.g., time stamps determined by the quality monitor module 145) that indicate a duration of the disruption of the network 105.

In some implementations, the quality monitor module 145 detects a network disruption via real time analysis of audio and/or video data using a machine learning model. The machine learning model may include and/or be associated with one or more of a convolutional neural network model, a random forest model, a clustering model, or a regression model, among other examples. In some implementations, the quality monitor module 145 uses the machine learning model to determine that the network disruption (e.g., a quality of communications does not satisfy a threshold) has occurred by providing candidate bandwidths, data packet loss rates, transmission signal strengths, and/or connection speeds as input to the machine learning model, and using the machine learning model to determine a likelihood, probability, or confidence that a particular outcome (e.g., pixelated video, frozen images, scrambled audio, and/or the like) will be achieved using the candidate parameters. In some implementations, the quality monitor module 145 provides a quality threshold as input to the machine learning model, and the quality monitor module 145 uses the machine learning model to determine or identify a particular combination of bandwidths, data packet loss rates, transmission signal strengths, and/or connection speeds that are likely to achieve a transmission of data of a determined quality (e.g., without pixelated images, frozen images, or scrambled audio).

The quality monitor module 145 (or another module internal or external to the user device 115) may train, update, and/or refine the machine learning model to increase the accuracy of the outcomes and/or parameters determined using the machine learning model. The quality monitor module 145 may train, update, and/or refine the machine learning model based on feedback and/or results from the subsequent data transmission operation, as well as from historical or related data transmission operations (e.g., from hundreds, thousands, or more historical or related data transmission operations) performed by the user device 115.

The temporary audio/video buffer 150 may store (e.g., cache) audio and/or video data captured by the user device 115. In some implementations the audio and/or video data includes one or more time stamps. For example, the audio and/or video data may include a "beginning" time stamp (e.g., a time stamp corresponding to a time of onset of a disruption of the network). Additionally, or alternatively, the audio and/or video data may include an "ending" time stamp (e.g., a time stamp corresponding to a time of resolution of the network disruption of the network). Additionally, or alternatively, the temporary audio/video buffer 150 may be configured to store a fixed amount of the audio and/or video data.

If the network disruption is longer than a duration afforded by a storage capacity of the temporary audio/video buffer 150, audio and/or video data stored within the temporary audio/video buffer may be overwritten using a first in, first out (FIFO) technique. Additionally, or alternatively, an entirety of the audio data and/or the video data stored within the temporary audio/video buffer 150 may be transmitted to another device (e.g., such as another user device 115 that is participating in the virtual meeting, the network disruption server 110, and/or the like). The network disruption server 110 may, in such a case, transmit to the user device 115 and/or the other device, a notification that a capacity of the temporary audio/video buffer 150 was exceeded due to a duration of the network disruption and that the transmitted content may be incomplete.

In some implementations, the temporary recording module 140 is configured to continuously overwrite the audio and/or video data within the temporary audio/video buffer 150. For example, if the network disruption server 110 does not provide a request to the user device 115 for data from the temporary audio/video buffer 150, the temporary recording module 140 may continuously overwrite the audio and/or video data within the temporary audio/video buffer 150.

The network disruption server 110 includes a playback module 155. The playback module 155 of the network disruption server 110 may receive input notifications from multiple, similar devices (e.g., multiples of the user device 115). In some implementations, the playback module 155 requests, for the duration of the network disruption, captured audio and/or video data from one or more of the multiple, similar devices during a time window corresponding to the duration. The playback module 155 of the network disruption server 110 may playback (e.g., transmit) the captured data to the user device 115 at an increased playback rate (e.g., 1.1× speed, 1.25× speed, etc.) until the user device 115 is caught back up with real time data.

The playback rate may be configurable and may be set dynamically such that a playback rate is increased with a lengthening of a duration of the network disruption. Additionally, or alternatively, the playback rate may be a fixed playback rate.

Additionally, or alternatively, the playback module 155 of the network disruption server 110 may detect an "idle" portion within the captured audio and/or video data (e.g., an absence of a user speaking and/or presenting visual information). In such a case, the playback module 155 may determine different playback rates for different portions of the captured audio and/or video. For example, and for a first portion of the captured audio and/or video data that includes a user speaking and or presenting visual information, the playback module 155 may determine a first playback rate. For a second portion of the captured audio and/or video data that is idle, the playback module 155 may determine a second playback rate that is greater relative to the first playback rate.

The temporary recording module 140 may continue capturing and transmitting audio and/or video data after the network disruption until the user device 115 is caught up. For example, and in some implementations, the temporary recording module 140 continues to capture and transmit "real time" audio and/or video data (e.g., audio and/or video data of a continuing, live presentation) while user device 115 is transmitting the audio and/or video data that was captured during the network disruption. In such a case, the audio and/or video of the continuing, live presentation may be transmitted subsequent to transmission of the audio and/or video data captured during the during the network disruption. In some implementations, such a technique may be propagated to multiple user devices 115 that experienced the network disruption.

If the network disruption is detected at the user device 115, and the user device 115 is that of a presenting user, the network disruption server 110 may playback (e.g., retransmit) audio and/or video data captured during the disruption by the user device 115 (e.g., playback or retransmit audio and/or video data from the presenting user to other user devices 115). In such a case, the playback rate may not be increased (or minimally increased), as the user device 115 is not impacted by the network disruption. The temporary recording module 140 may transmit the audio and/or video data once the network disruption is ended. In some cases, each additional user (e.g., each additional user device 115) may experience the network disruption (e.g., pixelated video, scrambled audio) immediately followed by the playback to ensure all audio and/or video content is presented.

In some implementations, a message may appear on a screen of the user device 115, and or another device, that indicates that the audio and/or video data being transferred (or being played) is due to a temporary disruption of a network of X-number of seconds. In this way, a user using the user device 115, and/or the other device, is aware of being slightly behind until the playback catches up, and will not find it necessary to ask what, if anything, was missed during the network disruption.

As described in connection with FIG. 1, the user device 115 includes an audio input component (e.g., the microphone 120). The user device 115 includes a video input component (e.g., the camera 130). The user device 115 further includes the network disruption correction application 135 stored in a computer-readable medium. The network disruption correction application 135 includes the temporary recording module 140 configured to determine, based on inputs from the audio input component and/or the video input component, that the user device 115 is sharing content with one or more other device participating in a virtual meeting. The temporary recording module 140 is further configured to store audio and/or video data (e.g., store audio and/or video data in the temporary audio/video buffer) based on the inputs from the audio input component and/or the video input component. Furthermore, the temporary recording module 140 is configured to cause the user device 115 to transmit (e.g., to the network disruption server 110) a portion of the audio and/or video data based on a beginning time stamp and an ending time stamp.

Relative to other apparatuses and techniques, the use of time stamps may optimize an amount of audio and/or video data (e.g., audio and/or video data related directly to the temporary network reduction) that is transmitted from the user device 115. In this way, a use of computing resources by the network disruption server 110, and a use of computing resource by the user device 115 and/or another device to which the audio and or video data may be transmitted, may be reduced to improve an overall computing efficiently. Additionally, or alternatively, users within the virtual meeting may be assured that they have not missed any audio and/or video content.

As indicated above, FIG. 1 is provided as an example. Other examples may differ from what is described with regard to FIG. 1.

FIGS. 2A-2E are diagrams of an example implementation 200 described herein. In the example implementation 200, the network disruption server 110, a first user device (e.g., the user device 115a), and a second user device (e.g., the user device 115b) are participating in a virtual meeting. Using techniques described in greater detail in connection with FIGS. 3A-7, one more portions of the example implementation 200 may be performed by the network disruption server 110, the user device 115a, and/or the user device 115b.

As shown in FIG. 2A, the user device 115a (e.g., a desktop computer) and the user device 115b (e.g., a cell phone) are participating in the virtual meeting using the network 105. As shown in FIG. 2A, a user associated with the user device 115a is speaking. Further, and as shown in FIG. 2A, a recording operation 205 is recording audio and video data associated with the user speaking. The recording operation 205 may be in response to one or more triggers, such as the user device 115a detecting that the user is speaking, the user device 115a receiving a command or request from the user, the user device 115a receiving a command or request from the network disruption server, or the user initiating a virtual meeting application, among other examples. As shown in FIG. 2A, audio and/or video data 210 is being transmitted to the user device 115b via the network 105.

Figure 2B:
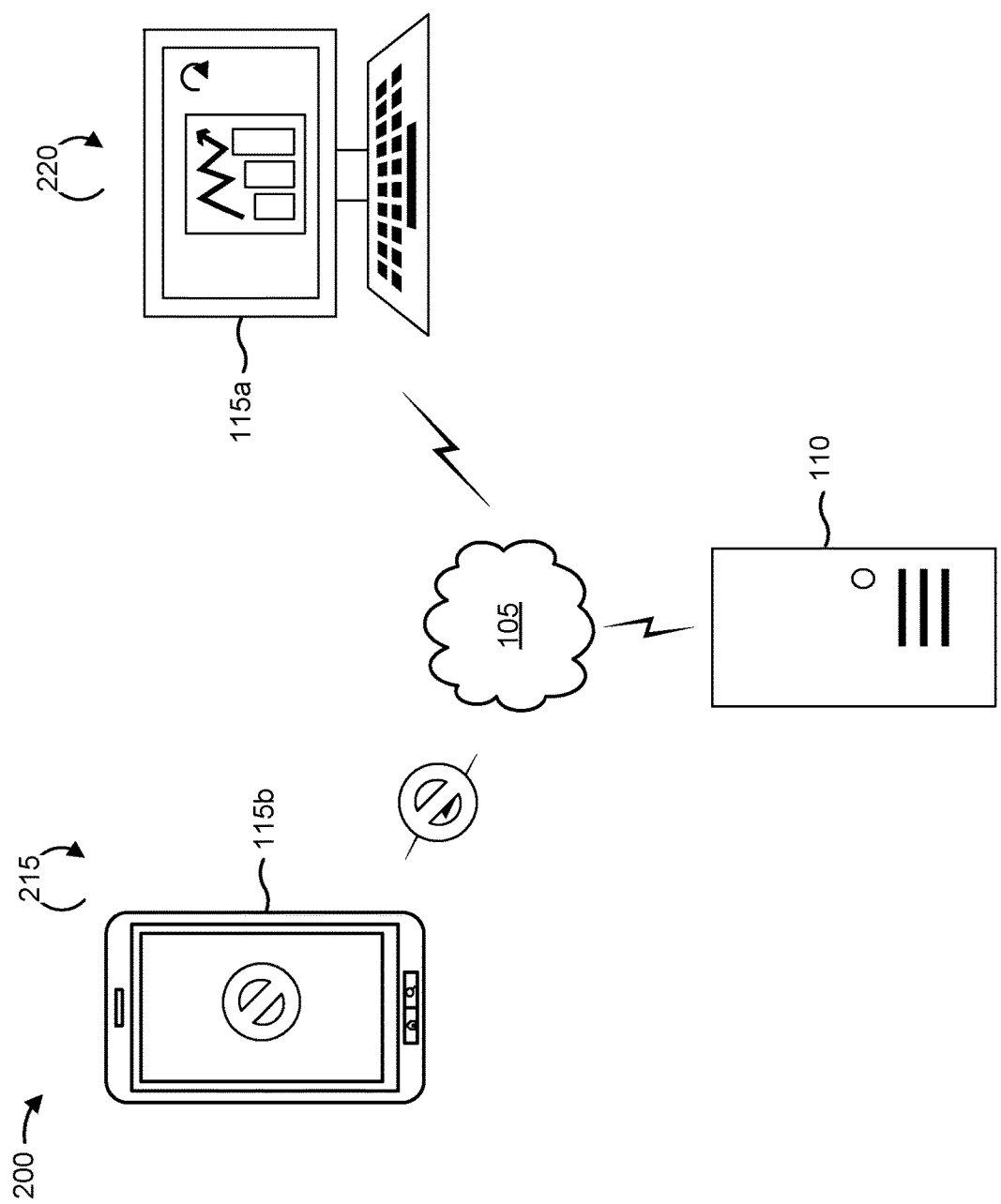

As shown in FIG. 2B, a communication link between the user device 115b and the network 105 is disrupted (e.g., a disruption of the network 105 occurs). In some implementations, and as part of an operation 215, the user device 115b detects the network disruption by determining a quality threshold (e.g., a quality threshold related to a bandwidth, a data packet loss rate, or a transmission signal strength) is not satisfied. During the network disruption, a recording operation 220 may have transitioned to recording a slide deck being shared as part of the continuing virtual meeting.

Figure 2C:
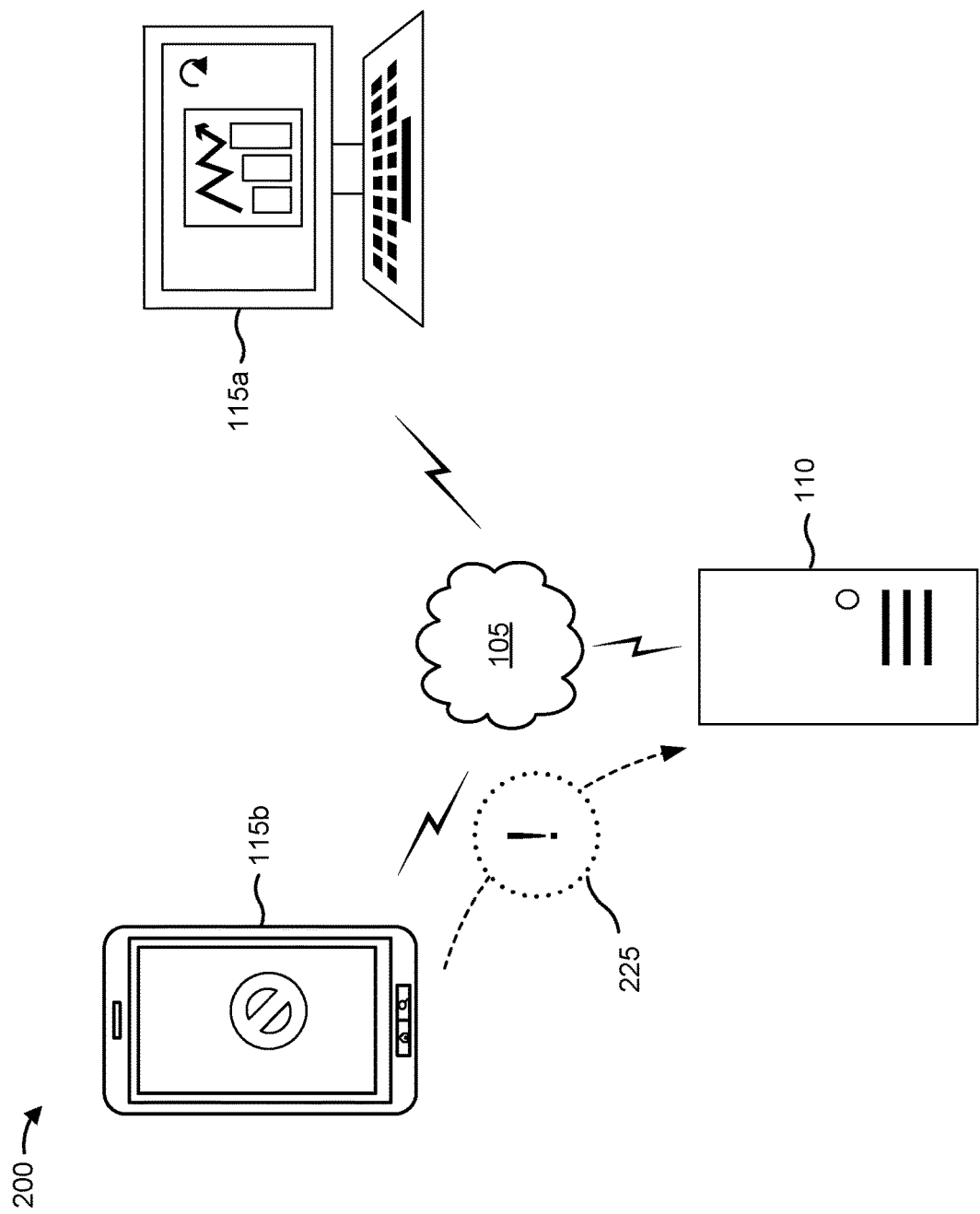

As shown in FIG. 2C, the user device 115b may transmit a notification 225 to the network disruption server 110. In some implementations, the notification 225 includes an indication that the network disruption has occurred. In some implementations, the notification 225 includes a time stamp corresponding to an onset of the network disruption. In some implementations, the notification includes a beginning time stamp and an ending time stamp corresponding to a temporary disruption.

Figure 2D:
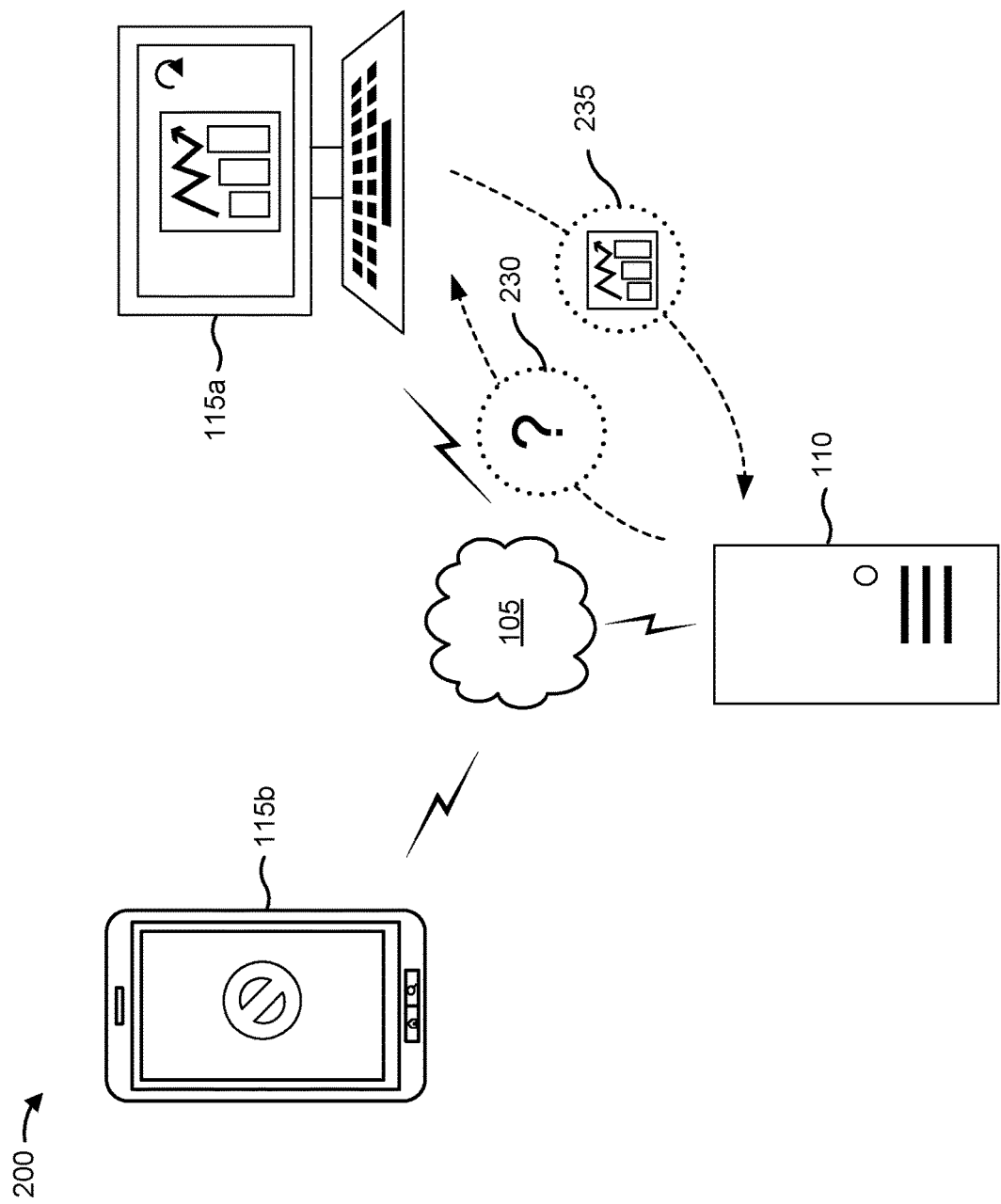

As shown in FIG. 2D, the network disruption server 110 may transmit a request 230 to the user device 115a. In some implementations, the request 230 includes the time stamp corresponding to the onset of the network disruption. In some implementations, the request 230 includes the beginning time stamp and the ending time stamp corresponding to the network disruption. Further, and as shown in FIG. 2D, the user device 115a transmits recorded audio and/or video data 235 based on receiving the request 230. In some implementations, the recorded audio and/or video data corresponds to portions of the virtual meeting that remain after the onset of the network disruption (e.g., the remainder of the virtual meeting). In some implementations, the recorded audio and/or video data corresponds to a portions of the virtual meeting corresponding to the network disruption.

Figure 2E:
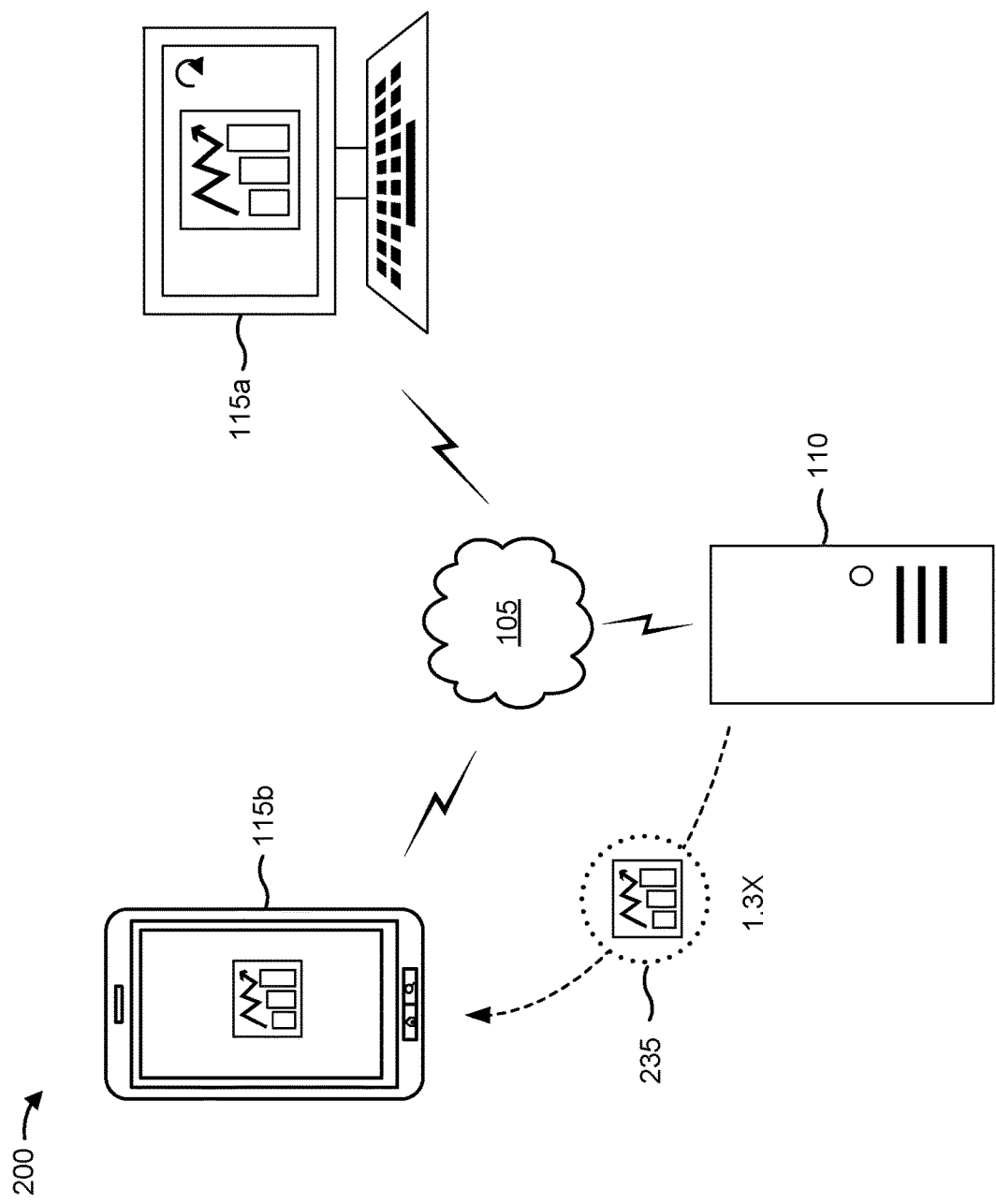

As shown in FIG. 2E, the network disruption server 110 may transmit the recorded audio and/or video data 235 (e.g., the slide deck) to the user device 115b. In some implementations, the recorded audio and/or video data 235 may be processed and/or transmitted by the network disruption server 110 at an accelerated playback rate. In some implementations, the accelerated playback rate may be user-specific. For example, the network disruption server 110 may store or access profiles corresponding to the users in the virtual meeting. The profiles may include information identifying a maximum accelerated playback rate. In such a situation, the recorded video and/or audio data 235 may be process and/or transmitted to different participating user devices 115b up to the maximum accelerated playback rate associated with the users of the user devices 115b.

Relative to other apparatuses and techniques, the example implementation described in connection with FIGS. 2A-2E increases an amount of audio and/or video data that may be recovered from the temporary network disruption and played back. In this way, usage (and overall computing efficiencies) of the user device 115a, the user device 115b, and/or the network disruption server 110 may be increased.

As indicated above, FIGS. 2A-2E are provided as an example. Other examples may differ from what is described with regard to FIGS. 2A-2E.

Figure 3A:
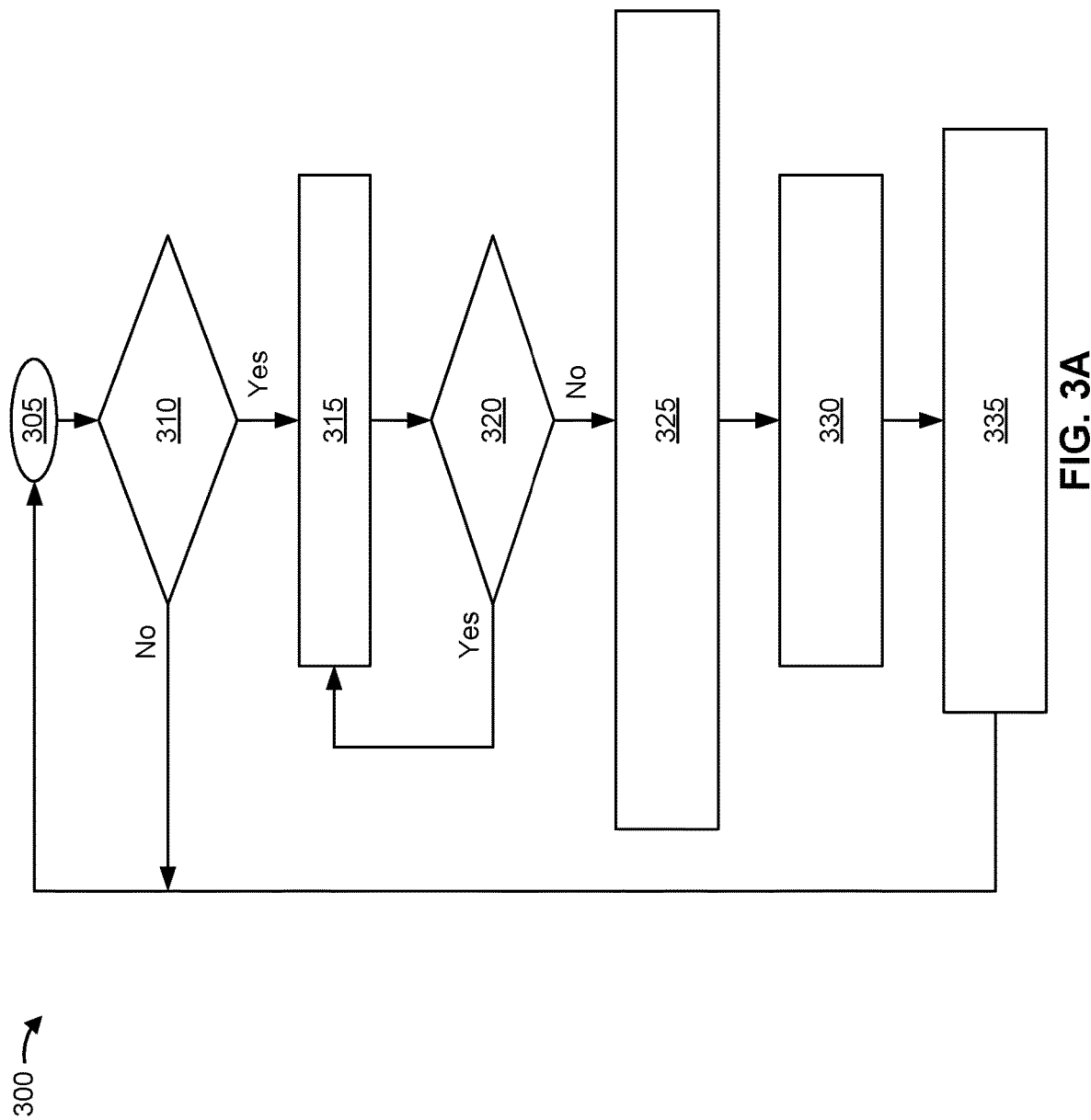
FIGS. 3A and 3B are flowcharts of one or more portions of an example implementation as performed one or more described herein.
Figure 3B:
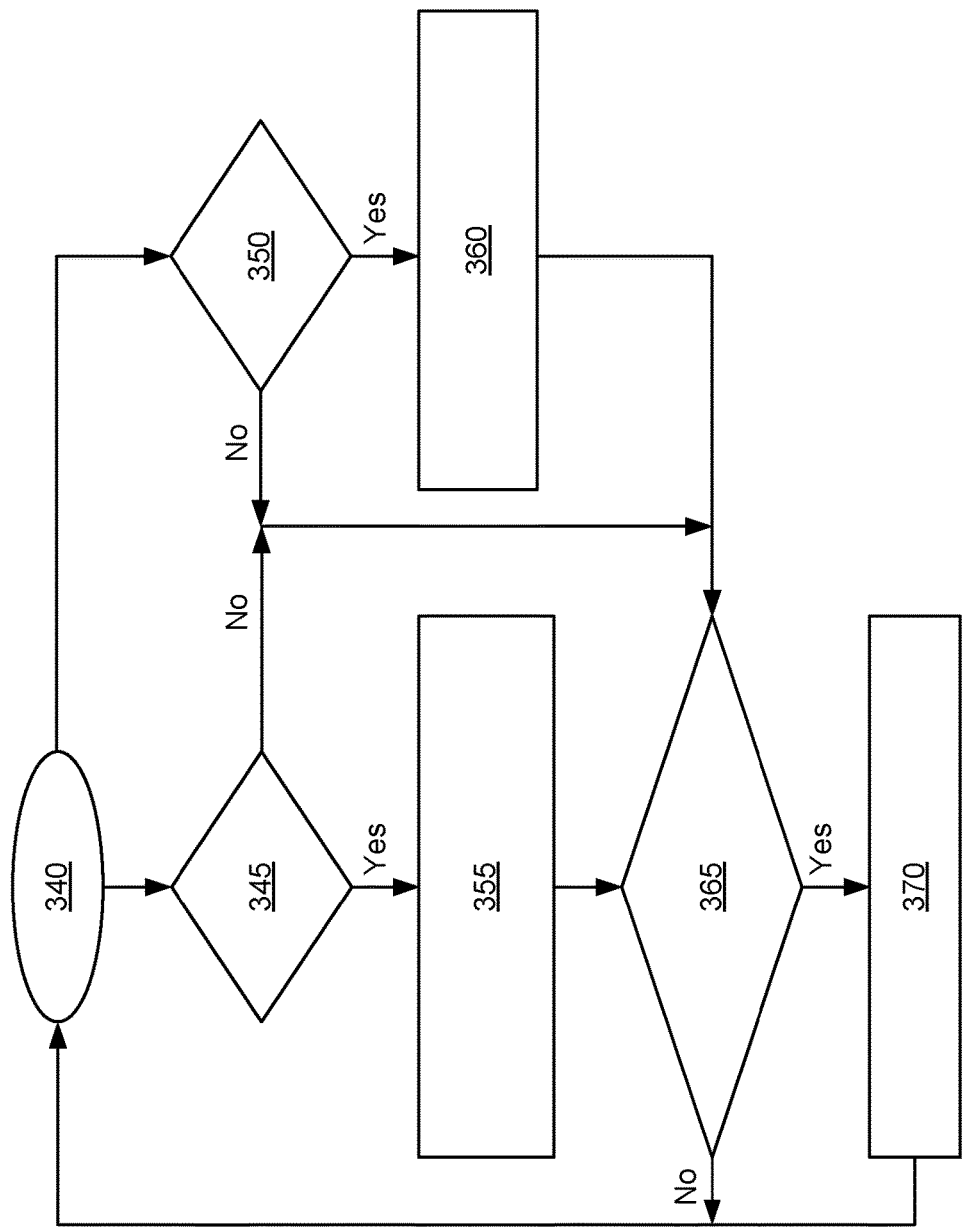

FIGS. 3A and 3B are flowcharts of one or more portions of an example implementation 300 performed by one or more devices described herein. The implementation 300 may include the network disruption server 110 performing operations corresponding to the flowchart shown in FIG. 3A. Additionally, or alternatively, the example implementation 300 may include the user device 115 performing operations corresponding to the flowchart shown in FIG. 3B. The network disruption server 110, the user device 115, and/or other devices in the network 105 may be associated with and/or participating in a virtual meeting.

FIG. 3A is a flowchart describing one or more operations that may performed by the network disruption server 110 as part of the example implementation 300. In some implementations, the one or more operations may be performed by a processor of the network disruption server 110, alone or in combination with the playback module 155. In some implementations, the network disruption server 110 interacts with a device associated with a presenting user (e.g., a user speaking or presenting audio and/or video data as part of a virtual meeting) and/or a device associated with an observing user (e.g., a user listening or viewing as part of the virtual meeting). While the following description focuses on the network disruption server 110 performing a series of operations in connection with a virtual meeting, in some implementations, the network disruption server 110 may simultaneously perform multiple series of operations in connection with a single virtual meeting and/or in connection with multiple different virtual meetings.

In some implementations, and beginning with block 305, the playback module 155 controls requests for audio and/or video data stored in a temporary audio/video buffer of a device (e.g., the temporary audio/video buffer 150 of the user device 115). As an example, the playback module 155 may determine whether a notification has been received from a quality monitor module (e.g., the quality monitor module 145 of the user device 115) indicating a network disruption (e.g., a communication quality threshold is not satisfied). If the playback module 155 does not receive notification of a network disruption (block 310 "No" branch), the playback module 155 may continue monitoring.

If playback module 155 receives a notification of a network disruption (block 310 "Yes" branch), the playback module 155 may determine the duration of the network disruption (block 315). In some implementations, the notification includes information identifying the duration of the network disruption. For example, the notification may include time stamps relating to the network disruption. In some implementations, the playback module 155 may request the duration from the quality monitor module 145. For example, based on receiving the notification, the playback module 155 may send a request to the quality monitor module 145 for a set of time stamps relating to the network disruption. The playback module 155 may receive the set of time stamps based on the request.

In some implementations, the notification, at block 310, is not received until a device recovers from the network disruption. In some implementations, the playback module 155 waits, at block 320, for notification that the network disruption no longer exists.

Additionally, or alternatively and in some cases, an agent residing on a cloud host computing system (e.g., Webex® Monitoring Service Data in Control Hub) may monitor the network 105 for quality issues associated with network disruptions. For example, the agent may detect quality issues, such as a dropped connection of a device (e.g., the user device 115) within a network (e.g., the network 105). In such a case, the network disruption server 110 may determine the duration of the network disruption based on a time when the agent reports the dropped connection and when the agent reports the device has reconnected.

If the network disruption continues to exist (block 320 "Yes" branch), the playback module 155 returns to block 315 to update the duration of the network disruption. In some implementations, the duration of the network disruption may be updated for multiple devices experiencing the network disruption (e.g., a different duration of network disruption may occur for each device). Monitoring a status of the network disruption by the network disruption server 110 (e.g., the playback module 155) at blocks 315 and 320 may reduce or prevent excessive wait times at a device awaiting audio and/or video data from the playback module 155.

If the network disruption does not exist (block 320 "No" branch), at block 325, the playback module 155 requests audio and/or visual data from temporary audio/video buffers of the device (e.g., the temporary audio/video buffer of the user device 115) storing audio and/or video data recorded during the network disruption. In some implementations, and at block 325, the playback module 155 may calculate different catch-up times for different devices participating in the virtual meeting.

In some implementations, an audio/video conferencing program (e.g., Webex®) monitors multiple devices to determine multiple users who may be speaking or are sharing audio and/or video content. Audio and/or video data may be requested from each device that may have experienced a network disruption.

At block 330, the network disruption server 110 transmits the audio and/or visual data to a device (e.g., a device that failed to receive audio and/or video content due to the network disruption) at an accelerated playback rate. In some implementations, the playback rate (e.g., a transmission rate) is increased relative to a streaming rate of the virtual meeting (e.g., 1.0×). In some embodiments the playback rate is dynamic and based on duration of the outage. In some implementations, the playback rate is configurable by a user of the device. In some implementations, the playback rate is configurable based on a user profile received by the network disruption server 110 from a user device, as described above in connection with FIG. 2E.

At block 335, the network disruption server 110, including the playback module 155, transmits real time audio and/or video data (e.g., audio and/or visual data not stored during the to the network disruption) to the device. In some implementations, the playback module 155 buffers the real time audio and/or video data received from multiple devices. The real time audio and/or video data is transmitted to the device (e.g., played back to the device that failed to receive audio and/or video content due to the network disruption) at the accelerated playback rate until the device is current. The playback module 155 can return to block 305 for the full duration of the virtual meeting.

As described in connection with FIG. 3A, and elsewhere herein, the network disruption server 110 may perform one or more operations. The one or more operations includes determining that a disruption of a network has occurred. The one or more operations includes determining a duration of the temporary disruption. The one or more operations includes requesting, from a first device, audio and/or video data stored by the first device over the duration of the temporary disruption. The one or more operations includes receiving, from the first device, the audio and/or video data stored by the first device over the duration of the temporary disruption. The one or more operations includes transmitting, to a second device, the audio and/or video data stored by the first device over the duration of the temporary disruption at an accelerated playback rate.

FIG. 3B is a flowchart describing one or more operations that may performed by the user device 115 as part of the example implementation 300. Beginning with block 340 in FIG. 3B the one or more operations may include the user device 115 (e.g., a processor of the user device 115) simultaneously determining whether the user device 115 is sharing audio content (block 345) and/or sharing video content (block 350). As an example, and as part of determining whether the user device is sharing audio content, the microphone 120 of the user device 115 may capture audio content that indicates a user is speaking. Additionally, or alternatively, the camera 130 of the user device 115 may capture images that indicate the user is sharing video content. Additionally, or alternatively, sharing of audio and/or video content may be determined based on an input from the user (a "share screen" selection by the user and/or initiation of a media player on the user device 115 by the user, among other examples).

If the user device 115 is sharing audio content (block 345 "Yes"), at block 345, the user device 115 may begin storing audio data in the temporary buffer on the user device 115 of the user speaking or audio being played (e.g., the audio data includes portions of an audio file associated with a presentation being played on the user device 115).

If the user device is sharing video content (block 350 "Yes" branch), at block 360, the user device 115 may begin storing video data in the temporary recording module 140 of the user device 115. In some implementations, the video data may include an input from the camera 130 on the user device 115. Additionally, or alternatively and in some implementations, the video data may include input from a screen of the user device 115 (e.g., a shared screen).

In some implementations the audio data and the video data are stored separately in the temporary audio/video buffer 150. In such cases, a synchronization file may be stored in the temporary audio/video buffer 150 along with the audio data and the video data.

After storing the audio data in the temporary recording module 140 (block 355) and/or storing the video data in the temporary recording module 140 block 360), or if the user device 115 is not sharing audio content and/or sharing audio content (blocks 345 and 350 "No" branches), the user device 115 may determine whether a request for buffer data, from the playback module 155 of network disruption server 110, has been received.

If the user device 115 does not receive a request for audio and/or video data from the network disruption server 110 (block 365 "No" branch), the user device 115 may continue performing the operations described above in connection with blocks 345 and 350. If the user device 115 does receive a request for audio and/or video data from the network disruption server 110 (block 365 "Yes" branch), the technique proceeds to block 370. At block 370, the user device 115 transmits the audio and/or video data stored in the temporary audio/video buffer 150 to the network disruption server 110 for playback by the playback module 155 until the network disruption has caught up to real time.

As described in connection with FIG. 3B and elsewhere herein, a device (e.g., the user device 115) may implement one or more operations. The one or more operations include determining audio and/or video content of a virtual meeting is being shared. The one or more operations include storing audio and/or video data corresponding to the audio and/or video content in a temporary storage buffer (e.g., the temporary audio/video buffer 150). The technique includes receiving (e.g., from the network disruption server 110) a request for a portion of the audio and/or video data. The one or more operations include transmitting (e.g., to the network disruption server 110) the portion of the audio and/or video data.

Additionally, or alternatively and using one or more operations described in connection with FIGS. 3A, 3B, and elsewhere herein, a first device of a listening or viewing user (e.g., the user device 115b of FIGS. 2A-2E) may experience a network disruption (e.g., a disruption of a virtual meeting) for a duration (e.g., 3 seconds), where content received from a second device (e.g., the user device 115a of FIGS. 2A-2E) of a presenting or speaking user is scrambled. Upon notification from the first device, the network disruption server 110 may request audio and/or video data from the second device, where the audio and/or video data corresponds to the duration of the network disruption.

In some implementations, the second device may have maintained a connection to the network disruption server 110, and audio and/or video data from the second device may already be stored on the network disruption server 110. For example, if the network disruption server 110 is recording the virtual meeting for replaying or transmitting to additional users at a later date, that recording may be saved on a memory on the network disruption server 110. In such a case, it may not be necessary for the network disruption server 110 to request the audio and/or video data from the second device.

Additionally, or alternatively, a first device of a presenting or speaking user (e.g., the user device 115a of FIGS. 2A-2E) may experience a network disruption for a duration (e.g. five seconds). As a result, a second device of a listening or viewing user (the user device 115b of FIGS. 2A-2E and/or additional device of additional users) is unable to receive and/or present audio and/or video content during the network disruption. The network disruption server 110 may, upon notification of the network disruption by the first device, request audio and/or video data from the first device. In this example, the network disruption server 110 may been disconnected from the first device and the audio and/or video data may be retransmitted from the first device to network disruption server 110.

Different catch-up times may be computed based on a network disruption time and a playback rate. As a first example, and for a network disruption of 3 seconds and a playback rate of 1.25×, a first catch-up time may be computed to be approximately 12 seconds. As a second example, and for a network disruption of 5 seconds and for a playback rate of 1.3×, a second catch-up time may be computed to be approximately 12 seconds.

As indicated above, FIGS. 3A and 3B are provided as an example. Other examples may differ from what is described with regard to FIGS. 3A and 3B.

Figure 4:
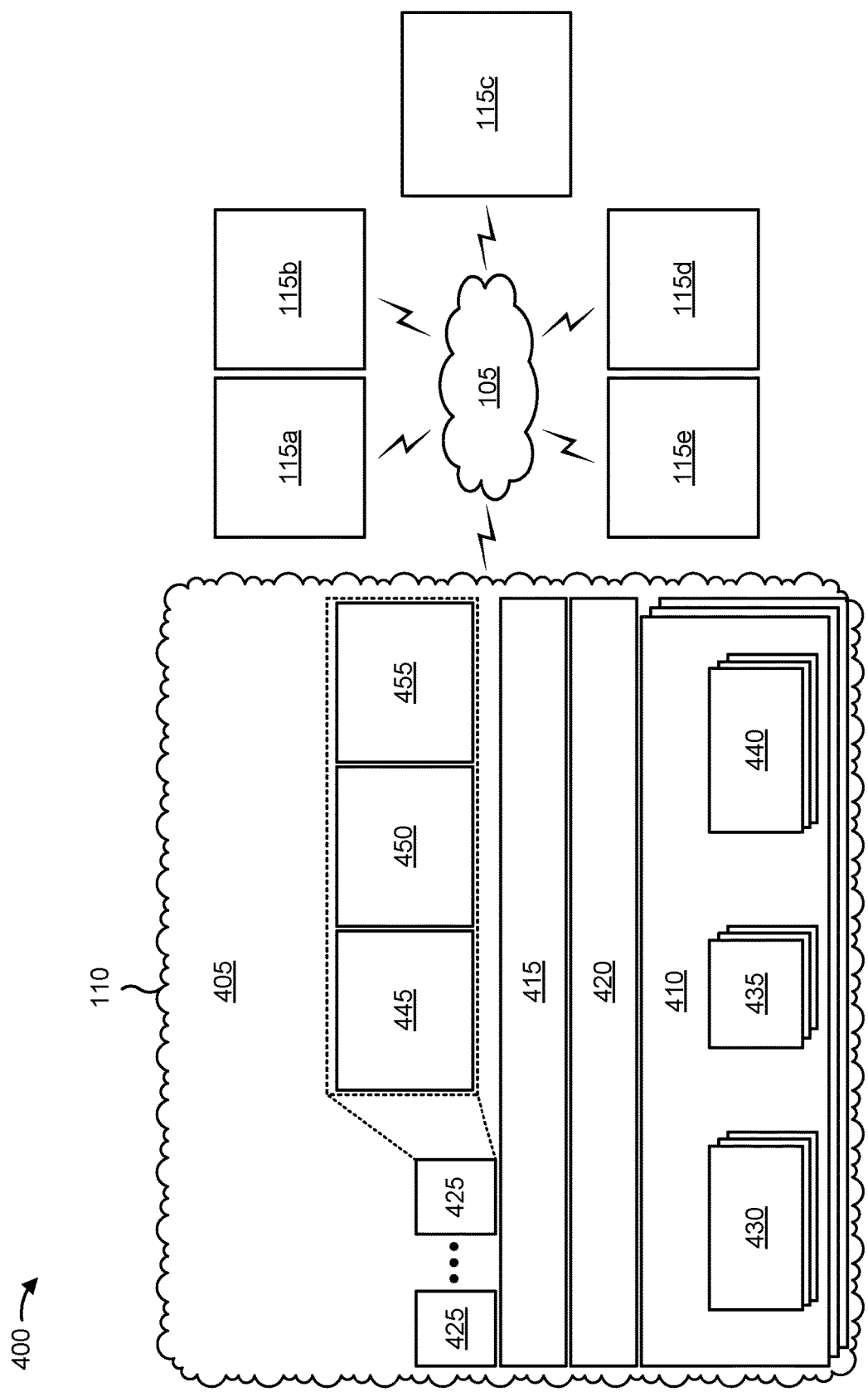
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include the network disruption server 110, which may include one or more elements of and/or may execute within a cloud computing system 405. The cloud computing system 405 may include one or more elements 410-455, as described in more detail below. As further shown in FIG. 4, environment 400 may include the network 105, and devices 115a-115e. Devices and/or elements of environment 400 may interconnect via wired connections and/or wireless connections.

The cloud computing system 405 may include computing hardware 410, a resource management component 415, a host operating system (OS) 420, and/or one or more virtual computing systems 425. The cloud computing system 405 may execute on, for example, an Amazon Web Services platform, a Microsoft Azure platform, or a Snowflake platform. The resource management component 415 may perform virtualization (e.g., abstraction) of computing hardware 410 to create the one or more virtual computing systems 425. Using virtualization, the resource management component 415 enables a single computing device (e.g., a computer or a server) to operate like multiple computing devices, such as by creating multiple isolated virtual computing systems 425 from computing hardware 410 of the single computing device. In this way, computing hardware 410 can operate more efficiently, with lower power consumption, higher reliability, higher availability, higher utilization, greater flexibility, and lower cost than using separate computing devices.

The computing hardware 410 may include hardware and corresponding resources from one or more computing devices. For example, computing hardware 410 may include hardware from a single computing device (e.g., a single server) or from multiple computing devices (e.g., multiple servers), such as multiple computing devices in one or more data centers. As shown, computing hardware 410 may include one or more processors 430, one or more memories 435, and/or one or more networking components 440. Examples of a processor, a memory, and a networking component (e.g., a communication component) are described elsewhere herein.

The resource management component 415 may include a virtualization application (e.g., executing on hardware, such as computing hardware 410) capable of virtualizing computing hardware 410 to start, stop, and/or manage one or more virtual computing systems 425. For example, the resource management component 415 may include a hypervisor (e.g., a bare-metal or Type 1 hypervisor, a hosted or Type 2 hypervisor, or another type of hypervisor) or a virtual machine monitor, such as when the virtual computing systems 425 are virtual machines 445. Additionally, or alternatively, the resource management component 415 may include a container manager, such as when the virtual computing systems 425 are containers 450. In some implementations, the resource management component 415 executes within and/or in coordination with a host operating system 420.

A virtual computing system 425 may include a virtual environment that enables cloud-based execution of operations and/or processes described herein using computing hardware 410. As shown, a virtual computing system 425 may include a virtual machine 445, a container 450, or a hybrid environment 455 that includes a virtual machine and a container, among other examples. A virtual computing system 425 may execute one or more applications using a file system that includes binary files, software libraries, and/or other resources required to execute applications on a guest operating system (e.g., within the virtual computing system 425) or the host operating system 420.

Although the network disruption server 110 may include one or more elements 410-455 of the cloud computing system 405, may execute within the cloud computing system 405, and/or may be hosted within the cloud computing system 405, in some implementations, the network disruption server 110 may not be cloud-based (e.g., may be implemented outside of a cloud computing system) or may be partially cloud-based. For example, the network disruption server 110 may include one or more devices that are not part of the cloud computing system 405 and which may include a standalone server or another type of computing device. The network disruption server 110 may perform one or more operations and/or processes described in more detail elsewhere herein.

The network 105 may include one or more wired and/or wireless networks. For example, the network 105 may include a cellular network (e.g., a 5G telecommunications network), a public land mobile network (PLMN), a local area network (LAN), a wide area network (WAN), a private network, the Internet, and/or a combination of these or other types of networks. The network 105 enables communication among the devices of the environment 400.

The user devices 115a-115e may each include one or more features of user device 115 as described in connection with FIG. 1. For example, each of the user devices 115a-115e may include the microphone 120, the speaker 125, and/or the camera 130. Additionally, or alternatively, each of the user devices 115a-115e may include the network disruption correction application 135 including the temporary recording module 140, the quality monitor module 145, and/or the temporary audio/video buffer 150.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
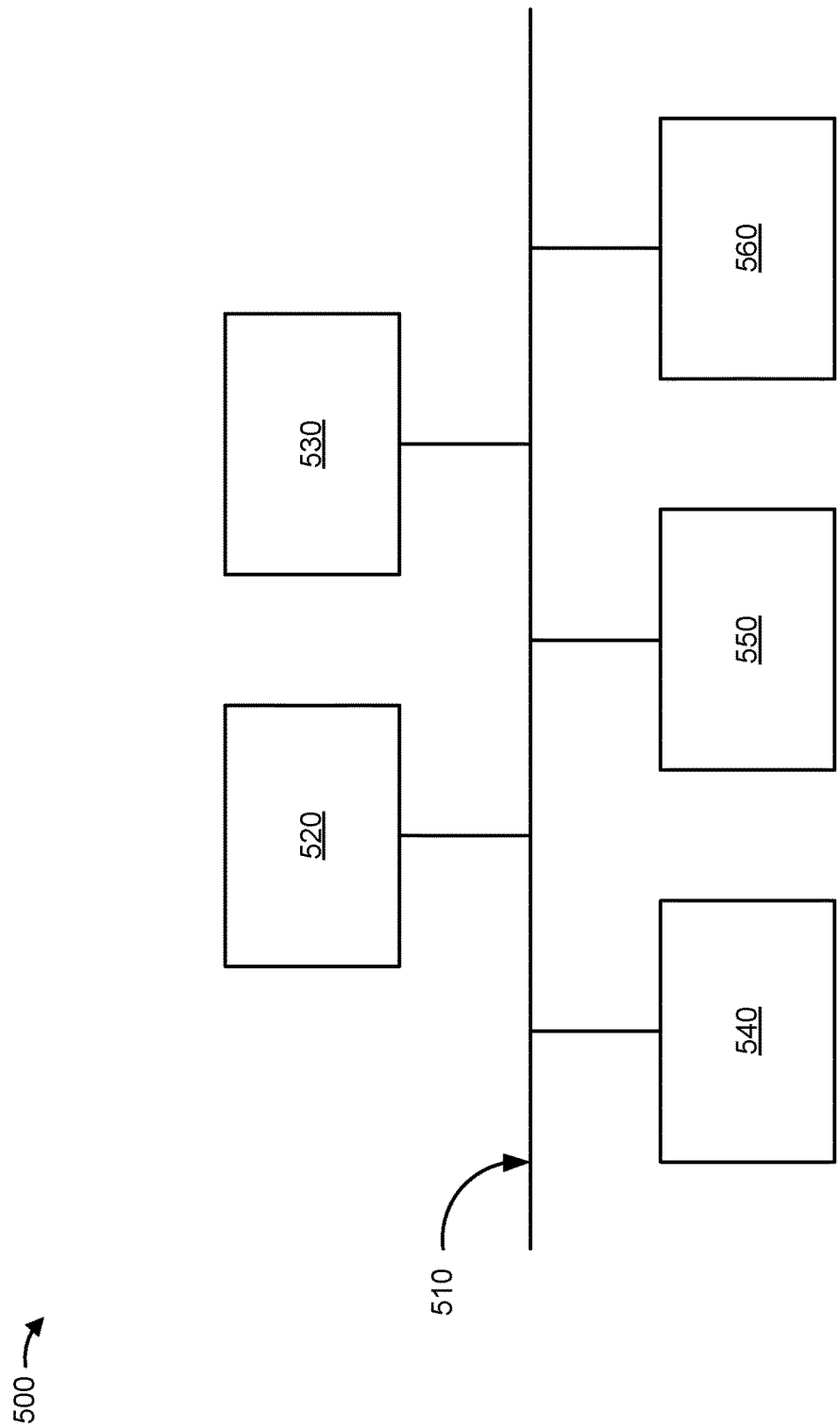
FIG. 5 is a diagram of example components of a device associated with correcting disruption of a network during a virtual meeting.

FIG. 5 is a diagram of example components of a device 500 associated with correcting temporary disruption of a network during a virtual meeting. The device 500 may correspond to the network disruption server 110, the network 105, the user device 115, and/or one or more devices of the cloud computing system 405. In some implementations, the network disruption server 110, the network 105, the user device 115, and/or the cloud computing system 405 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hard-wired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with correcting temporary disruption of a networks during virtual meetings. In some implementations, one or more process blocks of FIG. 6 are performed by the network disruption server 110. In some implementations, one or more process blocks of FIG. 6 are performed by another device or a group of devices separate from or included in the network disruption server 110, such as the playback module 155. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include determining that a temporary disruption of a network has occurred (block 610). For example, the network disruption server 110 may determine that a disruption of a network 105 has occurred, as described above.

As further shown in FIG. 6, process 600 may include determining a duration of the disruption (block 620). For example, the network disruption server 110 may determine a duration of the disruption, as described above.

As further shown in FIG. 6, process 600 may include requesting, from a first device, audio and/or video data stored by the first device over the duration of the disruption (block 630). For example, the network disruption server 110 may request, from a first device (e.g., the user device 115a) audio and/or video data stored by the first device over the duration of the disruption, as described above.

As further shown in FIG. 6, process 600 may include receiving, from the first device, the audio and/or video data stored by the first device over the duration of the disruption (block 640). For example, the network disruption server 110 may receive, from the first device, the audio and/or video data stored by the first device over the duration of the disruption, as described above.

As further shown in FIG. 6, process 600 may include transmitting, to a second device (e.g., user device 115b), the audio and/or video data stored by the first device over the duration of the disruption at an accelerated playback rate (block 650). For example, the network disruption server 110 may transmit, to a second device, the audio and/or video data stored by the first device over the duration of the disruption at an accelerated playback rate, as described above.

Process 600 may include additional implementations, such as any single implementation or any combination of implementations described below and/or in connection with one or more other processes described elsewhere herein.

In a first implementation, determining that the disruption has occurred includes determining that the disruption has occurred based on an indication received from the first device.

In a second implementation, alone or in combination with the first implementation, determining that the disruption has occurred includes determining that the disruption has occurred based on an indication received from the second device.

In a third implementation, alone or in combination with one or more of the first and second implementations, requesting the audio and/or video data stored over the duration of the disruption includes providing, to the first device, a beginning time stamp, corresponding to a first time of the audio and/or video data, and an ending time stamp corresponding to a second time of the audio and/or video data.

In a fourth implementation, alone or in combination with one or more of the first through third implementations, process 600 includes determining the accelerated playback rate based on the duration of the disruption.

In a fifth implementation, alone or in combination with one or more of the first through fourth implementations, process 600 includes transmitting, to the second device, a notification indicating that the audio and/or video data being transmitted at the accelerated playback rate is due to the disruption of the network 105.

In a sixth implementation, alone or in combination with one or more of the first through fifth implementations, process 600 includes buffering real time audio and/or video data received from the first device after the disruption of the network 105 has been resolved, and transmitting, to the second device, the real time audio and/or video data that has been buffered.

In a seventh implementation, alone or in combination with one or more of the first through sixth implementations, the accelerated playback rate is a first accelerated playback rate, and where transmitting the real time audio and/or video data includes transmitting the real time audio and/or video data at a second accelerated playback rate that is different than the first accelerated playback rate.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 associated with correcting temporary disruption of a networks during virtual meetings. In some implementations, one or more process blocks of FIG. 7 are performed by the user device 115. In some implementations, one or more process blocks of FIG. 7 are performed by another device or a group of devices separate from or included in the user device 115, such as the network disruption correction application 135, the temporary recording module 140, the quality monitor module 145, and/or the temporary audio/video buffer 150. Additionally, or alternatively, one or more process blocks of FIG. 7 may be performed by one or more components of device 500, such as processor 520, memory 530, input component 540, output component 550, and/or communication component 560.

As shown in FIG. 7, process 700 may include determining audio and/or video content of a virtual meeting is being shared (block 710). For example, the user device 115 may determine audio and/or video content of a virtual meeting is being shared, as described above.

As further shown in FIG. 7, process 700 may include storing audio and/or video data corresponding to the audio and/or video content in a temporary storage buffer (block 720). For example, the user device 115 may store audio and/or video data corresponding to the audio and/or video content in a temporary storage buffer (e.g., the temporary audio/video buffer 150), as described above.

As further shown in FIG. 7, process 700 may include receiving a request for a portion of the audio and/or video data (block 730). For example, the user device 115a may receive a request for a portion of the audio and/or video data, as described above. In some implementations, the portion of the audio and/or video data is identified by a beginning time stamp and an ending time stamp associated with a temporary disruption of a network 105 being used for the virtual meeting.

As further shown in FIG. 7, process 700 may include transmitting the portion of the audio and/or video data (block 740). For example, the user device 115a may transmit the portion of the audio and/or video data, as described above.

Process 700 may include additional implementations, such as any single implementation or any combination of implementations described below and/or in connection with one or more other processes described elsewhere herein.

In a first implementation, storing the audio and/or video data corresponding to the audio and/or video content in the temporary storage buffer includes continuously overwriting the audio and/or video data.

In a second implementation, alone or in combination with the first implementation, process 700 includes determining the beginning time stamp and the ending time stamp prior to transmitting the portion of the audio and/or video data.

In a third implementation, alone or in combination with one or more of the first and second implementations, process 700 includes receiving the beginning time stamp and the ending time stamp as part of the request for the portion of the audio and/or video data.

In a fourth implementation, alone or in combination with one or more of the first through third implementations, process 700 includes determining that the temporary disruption of the network 105 being used for the virtual meeting has occurred.

In a fifth implementation, alone or in combination with one or more of the first through fourth implementations, process 700 includes transmitting a notification that the temporary disruption of the network 105 has occurred.

In a sixth implementation, alone or in combination with one or more of the first through fifth implementations, transmitting the notification that the temporary disruption of the network 105 has occurred includes transmitting the beginning time stamp and the ending time stamp.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Some implementations described herein provide apparatuses and techniques for correcting a network disruption during a virtual meeting. In response to detecting audio and/or video input to a first device, audio and/or video data is recorded and stored in a temporary buffer of the first device. After the network disruption, and using time stamps, a network disruption server may request the audio and/or video data from the first device and transmit the audio and/or video data to a second device at an accelerated rate.

Relative to other apparatuses and techniques, the described implementations (e.g., using the time stamps) may increase an amount of audio and/or video data that that may be recovered from a network disruption and that may be transmitted to the second device over a given time period. In this way, an overall computing efficiency of the second device (e.g., use of computing resources for the given period of time) may be increased.

As described in greater detail above, some implementations described herein provide a method. The method includes determining that a temporary disruption of a network has occurred. The method includes determining a duration of the temporary disruption. The method includes requesting, from a first device, audio and/or video data stored by the first device over the duration of the temporary disruption. The method includes receiving, from the first device, the audio and/or video data stored by the first device over the duration of the temporary disruption. The method includes transmitting, to a second device, the audio and/or video data stored by the first device over the duration of the temporary disruption at an accelerated playback rate.

As described in greater detail above, some implementations described herein provide a method. The method includes determining audio and/or video content of a virtual meeting is being shared. The method includes storing audio and/or video data corresponding to the audio and/or video content in a temporary storage buffer. The method includes receiving a request for a portion of the audio and/or video data, where the portion of the audio and/or video data is identified by a beginning time stamp and an ending time stamp associated with a temporary disruption of a network being used for the virtual meeting. The method includes transmitting the portion of the audio and/or video data.

As described in greater detail above, some implementations described herein provide a device. The device includes an audio input component. The device includes a video input component. The device includes a network disruption correction application stored in a non-transitory computer-readable medium that is configured to determine that a temporary disruption of a network being used for a virtual meeting has occurred, determine a beginning time stamp and an ending time stamp associated with the temporary disruption, transmit a request that includes the beginning time stamp and the ending time stamp for a retransmission of audio and/or video data from the virtual meeting that was missed during the temporary disruption, receive the audio and/or video data, and present the audio and/or video data at an accelerated playback speed.

As used herein, the term "and/or," when used in connection with a plurality of items, is intended to cover each of the plurality of items alone and any and all combinations of the plurality of items. For example, "A and/or B" covers "A and B," "A and not B," and "B and not A."

As used herein, the term "module", when being executable by a processor, may refer to a combination of hardware, firmware, and/or hardware.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   determining that a disruption of a network has occurred;
   determining a duration of the disruption;
   requesting, from a first device, audio and/or video data stored by the first device over the duration of the disruption;
   receiving, from the first device, the audio and/or video data stored by the first device over the duration of the disruption; and
   transmitting, to a second device, the audio and/or video data stored by the first device over the duration of the disruption at a first accelerated playback rate,
   wherein at least one of:
   the first accelerated playback rate is based on the duration of the disruption, or real-time audio and/or video data, received from the first device after the disruption has been resolved, is further transmitted to the second device at a second accelerated playback rate different than the first accelerated playback rate.

2. The method of claim 1, wherein determining that the disruption has occurred comprises:
determining that the disruption has occurred based on an indication received from the first device.

3. The method of claim 1, wherein determining that the disruption has occurred comprises:
determining that the disruption has occurred based on an indication received from the second device.

4. The method of claim 1, wherein requesting the audio and/or video data stored over the duration of the disruption comprises:
providing, to the first device, a beginning time stamp, corresponding to a first time of the audio and/or video data, and an ending time stamp corresponding to a second time of the audio and/or video data.

5. The method of claim 1, further comprising:
determining the first accelerated playback rate based on the duration of the disruption.

6. The method of claim 1, further comprising:
transmitting, to the second device, a notification indicating that the audio and/or video data being transmitted at the first accelerated playback rate is due to the disruption of the network.

7. The method of claim 1, further comprising:
buffering real-time audio and/or video data.

8. The method of claim 1, further comprising:
transmitting the real-time audio and/or video data at the second accelerated playback rate.

9. A method, comprising:
determining audio and/or video content of a virtual meeting is being shared;
storing audio and/or video data corresponding to the audio and/or video content in a temporary storage buffer;
receiving a request for a portion of the audio and/or video data,
wherein the portion of the audio and/or video data is identified by a beginning time stamp and an ending time stamp associated with a temporary disruption of a network being used for the virtual meeting; and
transmitting the portion of the audio and/or video data at an accelerated playback rate,
wherein the accelerated playback rate is based on a duration of the temporary disruption.

10. The method of claim 9, wherein storing the audio and/or video data corresponding to the audio and/or video content in the temporary storage buffer comprises:
continuously overwriting the audio and/or video data.

11. The method of claim 9, further comprising:
determining the beginning time stamp and the ending time stamp prior to transmitting the portion of the audio and/or video data.

12. The method of claim 11, further comprising:
receiving the beginning time stamp and the ending time stamp as part of the request for the portion of the audio and/or video data.

13. The method of claim 11, further comprising:
determining that the temporary disruption of the network being used for the virtual meeting has occurred.

14. The method of claim 13, further comprising:
transmitting a notification that the temporary disruption of the network has occurred.

15. The method of claim 14, wherein transmitting the notification that the temporary disruption of the network has occurred comprises:
transmitting the beginning time stamp and the ending time stamp.

16. A device comprising:
an audio input component;
a video input component; and
a network disruption correction application stored in a non-transitory computer-readable medium and configured to:
determine that a temporary disruption of a network being used for a virtual meeting has occurred;
determine a beginning time stamp and an ending time stamp associated with the temporary disruption;
transmit a request that includes the beginning time stamp and the ending time stamp for a retransmission of audio and/or video data from the virtual meeting that was missed during the temporary disruption;
receive the audio and/or video data;
present the audio and/or video data at a first accelerated playback speed; and
present updated real-time audio and/or video data, received after the temporary disruption has been resolved, at a second playback speed different than the first accelerated playback speed.

17. The device of claim 16, wherein the network disruption correction application configured to determine that the temporary disruption of the network being used for the virtual meeting has occurred is configured to:
determine that the temporary disruption of the network has occurred between the network and the device.

18. The device of claim 16, wherein the network disruption correction application configured to determine that the temporary disruption of the network being used for the virtual meeting has occurred is configured to:
determine that the temporary disruption of the network has occurred between the network and another device.

19. The device of claim 16, wherein the network disruption correction application is further configured to:
transmit a notification of the temporary disruption of the network that includes one or more parameters related to a bandwidth, a data packet loss rate, or a transmission signal strength within the network.

20. The device of claim 16, wherein the network disruption correction application is further configured to:
determine that the temporary disruption of the network has been resolved, and
transmit a notification indicating that the temporary disruption of the network has been resolved.

* * * * *